Dec. 10, 1963  W. B. NODWELL  3,113,805
VEHICLE TRACK MOUNTINGS
Filed Dec. 15, 1960  2 Sheets-Sheet 1
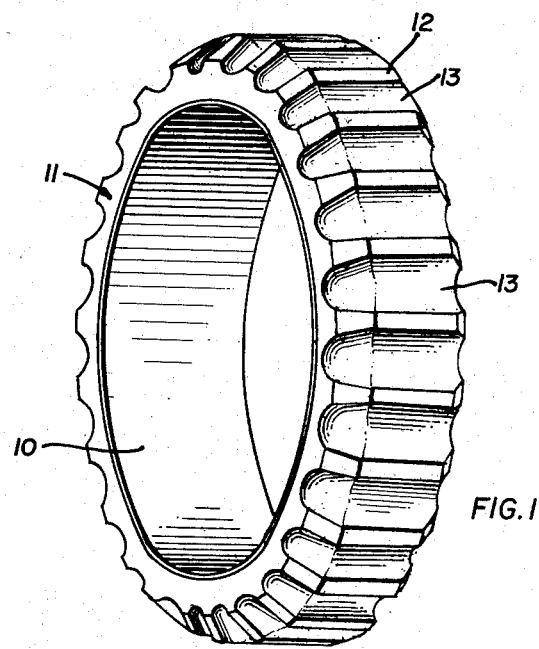
FIG. 1
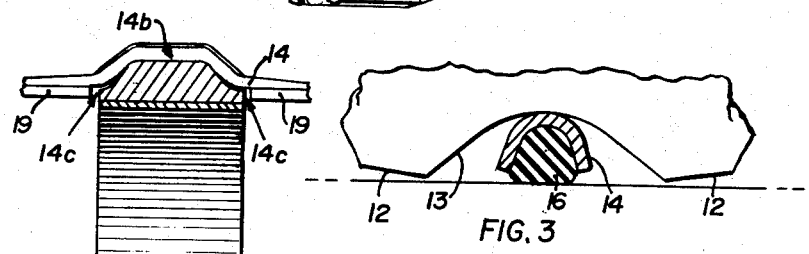
FIG. 2  FIG. 3
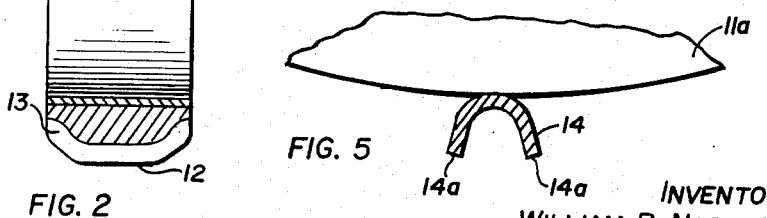
FIG. 4
FIG. 5
INVENTOR
WILLIAM B. NODWELL
BY Smart & Biggar
ATTORNEYS

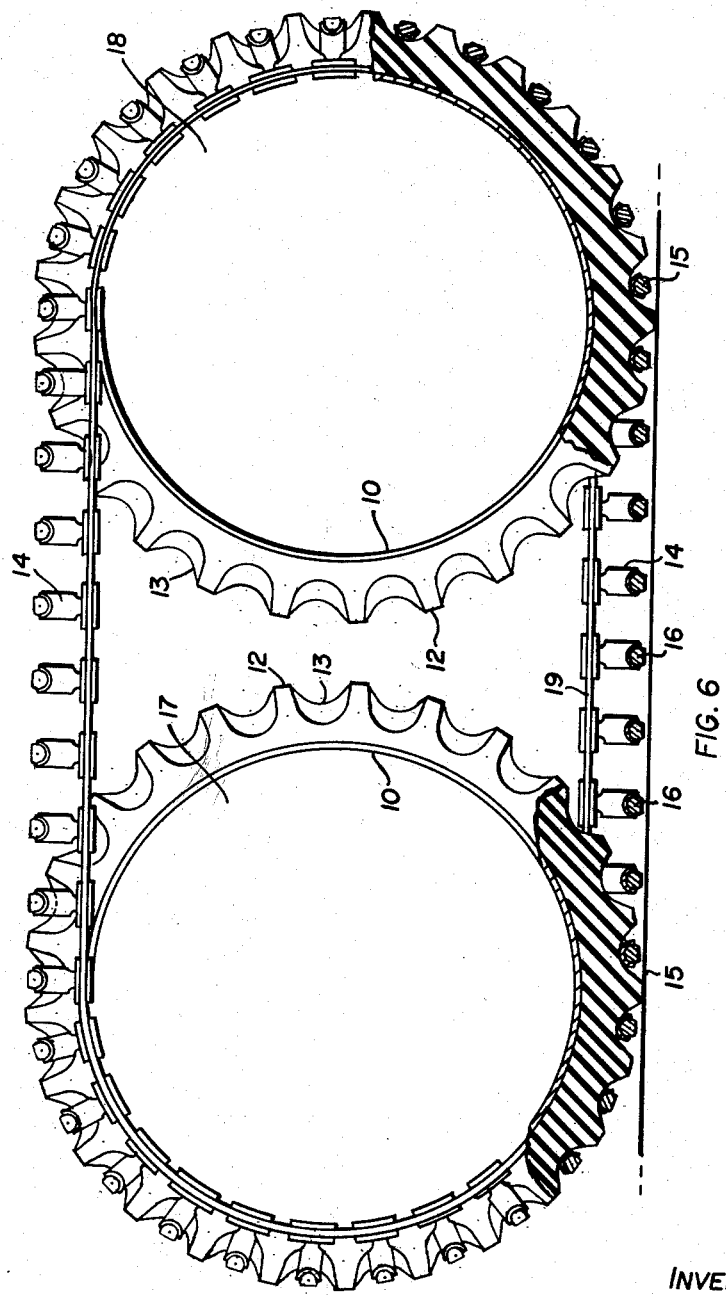

United States Patent Office 3,113,805
Patented Dec. 10, 1963

3,113,805
VEHICLE TRACK MOUNTINGS
William Bruce Nodwell, Calgary, Alberta, Canada, assignor to Robin-Nodwell Mfg. Ltd., Calgary, Alberta, Canada, a company of Canada
Filed Dec. 15, 1960, Ser. No. 76,026
1 Claim. (Cl. 305—15)

This invention relates to vehicle tracks and in particular to those types of vehicle track which are commonly referred to as "ladder" type tracks and which consists of a plurality of parallel mounted endless belts (in this specification and in the appended claim, the expression "endless belt" includes belts which are spliced or joined as well as belts which have no join or splice), having cross bars secured between them in ladderlike formation, such cross bars being generally referred to as "grouser" bars.

A number of difficulties are experienced with conventional tracks of the above type when the vehicles mounting the same are operated over asphalt, cement, pavement, or hard ground. Firstly, the "grousers" tend to gouge or dig into the traction surface because the weight of the vehicle is concentrated upon the grouser which at any particular moment happens to be directly under the axle of the wheel or "bogie" upon which the track is mounted. Secondly, if the wheels are made of hard material, the lack of cushioning between the wheel and the grouser results in extreme vibration throughout the vehicle. In all cases, there is an excessive amount of grouser wear. Another problem common to all vehicles mounting laddertype tracks is a general tendency for the wheels to tend to climb out of the track.

An object of the present invention is to provide novel means whereby the difficulties enumerated above are eliminated or minimized.

According to the present invention, the bogie wheels of a vehicle mounting ladder-type tracks are provided with tires in which the outer periphery is detented to accommodate each grouser bar within a detent so that the material of the tire projects radially outward between each grouser bar in a tooth-like projection to contact the traction surface.

According to a preferred embodiment of the invention, the grouser bars are provided with inserts forming ground engaging pads whereby in operation the said pads as well as the tooth-like radial projections of the tire make contact with the traction surface.

The invention and its operation will be understood in greater detail by reference to the following detailed specification taken in conjunction with the accompanying drawings wherein FIGURE 1 is an isometric projection of a bogie wheel tire according to the invention;

FIGURE 2 is a section through the tire shown in FIGURE 1 illustrating a grouser bar in position in a detent;

FIGURE 3 is a fragmentary section through a tire according to the invention at right angles to the axis of rotation of the wheel illustrating a cross section of a grouser bar on which is mounted an insert according to a preferred embodiment of the invention;

FIGURE 4 is a view similar to FIGURE 3 illustrating a section through a grouser bar without the insert;

FIGURE 5 is a similar view to FIGURES 3 and 4 illustrating a section through a grouser bar mounted on a conventional bogie wheel tire;

FIGURE 6 is a side view, partly in section, of a track assembly according to the invention.

Referring now more particularly to the drawings wherein like numerals are used in illustrating like parts throughout, a bogie wheel tire according to the invention may suitably consist of a steel base or rim 10 upon which is secured, for example by bonding, the tire body 11 which is suitably formed from a resilient material such as natural or artificial rubber. Instead of being formed with a rim and a body as just described, the time may be formed in one piece, and instead of being formed of resilient material, the tire body may be made of any other suitable material such for instance as wear-resistant metal.

The exterior periphery of the body portion 11 is formed with the tooth-like projections 12 between which are the detents 13 which are shaped to accommodate the grouser bars 14 so that when the projections 12 contact a traction surface 15, the grouser bar 14 will not contact the traction surface (see FIGURES 3 and 4).

In a preferred form of the invention, the grouser bars 14 are provided with inserts 16 which are set into the grouser bars and bonded thereto and which project sufficiently to make contact with the traction surface 15 to support the load of the vehicle in cooperation with the tooth-like projections 12.

Referring particularly to FIGURES 3, 4 and 5, it will be observed that the invention greatly increases the amount of contact area between the track and the traction surface at the point of most concentrated load (i.e. immediately under the bogie axle). In conventional track assemblies, the situation is as illustrated in FIGURE 5 where the bogie rests against the outer periphery of a bogie tire 11a and only the ends 14a of the channel formed by the grouser bars 14 make contact with the traction surface.

According to the invention, where the situation is as illustrated in FIGURES 3 and 4, the whole of the tooth-like projections 12 make contact with the traction surface, and in the preferred embodiment illustrated in FIGURE 3, this contact area is increased by the insert 16. The contact area according to the invention is from four to six times the contact area of a conventional track assembly of the type illustrated fragmentarily in FIGURE 5.

A track assembly according to the invention may comprise any conventional arrangement of track bogies and/or drive sprockets, one of the simplest assemblies being illustrated in FIGURE 6 and consisting of the bogie wheels 17 and 18 mounting tires 10 of the type illustrated in FIGURE 1, one of the bogie wheels 17 and 18 being a drive wheel, and the other an idler. The track consists of two parallel belts 19 upon which are mounted a plurality of grouser bars 14 which in the embodiment illustrated are provided with the inserts 16.

It will be observed that in the assembly illustrated where the detents 13 are shaped to fit the contours of the grouser bars (see FIGURE 2) as at 14b, the full width of the tire body projects radially outwardly between the two belts 19 as at 14c with an appropriate running clearance. Consequently, any side thrust simply pushes the tire 14 against the track belt 19 at points 14c and the side thrust is resisted, thus counteracting any tendency of the bogie wheel to climb out of the track.

While the grouser inserts 16 and the tire bodies 14 are preferably made from rubber bonded respectively to the grouser bars and to the rim 11, the invention is obviously not limited to the use of any particular material. Moreover, although a simple two wheel track assembly has been used to illustrate the track assembly of the invention, it is obvious that the invention applies broadly to any track assembly employing ladder-type tracks.

The embodiments of the invention in which an exclusive property or privilege is claimed are defined as follows:

A ladder-type track assembly for tracked vehicles comprising a pair of endless belts connected together by transverse grouser bars and at least two bogie wheels spaced apart longitudinally of the track, each wheel having a tire and each tire being formed at the periphery thereof with a plurality of transverse detents, each shaped to accommodate therein one of said grouser bars, and a transversely extending tooth-like projection between adjacent detents extending radially outward of said detents, whereby in operation on a road surface said tooth-like projections will make contact with the road surface while the grouser bars within the detents and the track are maintained out of load bearing contact with the road surface.

References Cited in the file of this patent

UNITED STATES PATENTS

| | | | |
|---|---|---|---|
| 2,188,025 | Weiss | Jan. 23, | 1940 |
| 2,353,122 | Bigley | July 11, | 1944 |
| 2,708,978 | Robitaille | May 24, | 1955 |
| 2,786,725 | Thorne | Mar. 26, | 1957 |

FOREIGN PATENTS

| | | | |
|---|---|---|---|
| 474,714 | Great Britain | Nov. 5, | 1937 |
| 478,066 | Canada | Oct. 30, | 1951 |
| 1,151,060 | France | Oct. 19, | 1957 |